United States Patent [19]
Loftfield et al.

[11] Patent Number: 6,149,049
[45] Date of Patent: Nov. 21, 2000

[54] METALLURGICAL BONDING OF DISSIMILAR METAL TUBES

[75] Inventors: Scott A. Loftfield; Richard E. Loftfield, both of Jacksonville, Fla.

[73] Assignee: Huron Tech Corp, Jacksonville, Fla.

[21] Appl. No.: 09/507,367

[22] Filed: Feb. 18, 2000

Related U.S. Application Data

[60] Provisional application No. 60/121,247, Feb. 23, 1999.
[51] Int. Cl.[7] .............................. B23K 31/02; B23K 31/10
[52] U.S. Cl. ...................... 228/164; 228/164; 228/122.1; 228/170; 219/78.15
[58] Field of Search .................................. 228/164, 122.1, 228/170; 219/78.15

[56] References Cited

U.S. PATENT DOCUMENTS

| | | |
|---|---|---|
| 3,105,293 | 10/1963 | Skinner et al. . |
| 3,443,306 | 5/1969 | Meyer . |
| 3,629,932 | 12/1971 | Richter . |
| 3,733,686 | 5/1973 | Maucher . |
| 3,791,026 | 2/1974 | Dufrene . |
| 4,459,062 | 7/1984 | Siebert . |
| 4,688,691 | 8/1987 | Christian . |

*Primary Examiner*—Patrick Ryan
*Assistant Examiner*—Jonathan Johnson
*Attorney, Agent, or Firm*—Andrew E. Pierce

[57] ABSTRACT

A method of metallurgically joining dissimilar metal tubes using a connecting member clad metal tube in which the clad metal is the same or similar metal to a metal of one of the dissimilar tubes to be joined and is susceptible to bonding by welding. The underlying clad metal connecting member metal is a dissimilar metal which is susceptible to bonding by soldering.

5 Claims, 1 Drawing Sheet

METALLURGICAL BONDING OF DISSIMILAR METAL TUBES

The priority date of U.S. Ser. No. 60/121,247, filed Feb. 23, 1999, is claimed.

TECHNICAL FIELD

This invention relates to processes for metallurgically bonding clad metal sheets and metal tubes composed of dissimilar metals.

In one aspect, this invention relates to a method of forming a joint between the two parts of a composite, and especially composite parts, one part of which is made of a corrosion resistant metal and the other part of a corrosion susceptible metal. Examples of such corrosion resistant metals are the valve metals, for instance, titanium, tantalum, zirconium, and niobium and alloys and mixtures thereof and the platinum group metals. Examples of corrosion susceptible metals are copper, aluminum, and steel. In another aspect, this invention relates to a method of forming a connection between tubular parts, for instance, copper tubing for use on the compressor side of a heat pump and titanium tubing for use on the pool water side in heat pumps for use in swimming pools, heating tubes for chlorination devices, and stub ends on cooling coils where a steel flange must be joined to the end of a titanium heat exchanger.

BACKGROUND OF THE INVENTION

In order to form a joint between a corrosion resistant metal tube and a corrosion susceptible metal tube, a mechanical fitting has been employed. For instance, a titanium tube can be welded to a titanium portion of the fitting with an O-ring seal placed intermediate between the titanium and copper portions of the fitting which are, in turn, soldered to a copper tube. Titanium heat exchanger tubing for use with a swimming pool heat pump can withstand chlorine levels one-thousand times higher than that experienced in a swimming pool without corroding or pitting. This is a significant improvement over the prior art use of copper-nickel alloys for swimming pool heat exchangers. Such alloys can corrode rapidly if the chlorine level in the pool becomes too high, allowing water to mix with the FREON® in the refrigeration system which, in turn, will destroy the compressor and the evaporator, resulting in a complete loss of the heat pump unit.

With the advent of titanium heat exchangers for swimming pool heat pumps, a solution to the problem of metallurgically bonding copper to titanium was sought in order to provide a metallurgically bonded connection of the titanium and copper tubing in the system. Difficulty has been experienced in making such connections of the titanium tubing for the heat pump heat exchanger to the copper tubing leading to the heat pump compressor and evaporator. Since titanium cannot be welded, brazed or soldered to copper, mechanical joints such as have been described above have been used. Such mechanical joints ultimately fail because of vibration in the system or failure of the O-ring seal.

In U.S. Pat. No. 3,791,026 a method of forming a joint between tubular parts, one of which is made of niobium and the other of stainless steel is disclosed. The tubes are assembled cylindrically one inside the other with provision for a clearance, the steel tube being located externally and provided at its extremity with an external machined annular flange forming a reservoir at the joint which is filled with a suitable brazing compound. The joint is subsequently heated under vacuum at 1,020° to 1,030° C.

Titanium clad steel plate, particularly that manufactured by the explosion bonding process, has become quite popular for the fabrication of chemical process equipment for use under highly corrosive conditions. To fabricate equipment, it is necessary to weld seams or joints at various sections. This poses several problems because of the requirements for welding titanium. Welding of the steel segment of the titanium clad steel plate must be accomplished without contacting the steel with the titanium metal. Welding of the titanium segment must be accomplished without contacting the titanium with the steel. If such contact occurs, either the titanium metal cladding or the titanium weld is ruined. Such contact causes the weld to crack. Welding titanium also requires the use of one of the well-known inert gas welding methods, e.g., the heliarc welding process. In the past, welding of such clad steel plates has required removal of the titanium cladding from the area of the steel weld and, after the steel weld is complete, adding a titanium filler strip and then covering the entire area with a second, wider titanium strip which is then welded to the titanium clad. While seams can be welded by this procedure, it is time consuming, requires an extra titanium filler strip, and can cause problems should leaks, particularly pinhole leaks, occur. In any case, an easier, less costly and more easily repaired system for welding titanium clad steel is needed.

It is an object of the present invention to provide a method of welding titanium clad steel. It is also an object to provide a method for welding titanium clad steel without contacting the titanium weld with the underlying steel. It is also an object of the present invention to provide a method of welding titanium clad steel that does not require an extra titanium filler strip.

Among the characteristics of steel which contribute to its widespread use in pressure vessels are its strength and availability at reasonable cost, but steel is attacked by many chemicals and cannot be exposed to such chemicals, particularly at elevated temperatures and pressures. To offset this problem, it has been common practice to clad steel with less reactive, yet more expensive, value SAL 2/15/00 meter, such as tantalum, zirconium and titanium and their alloys. This, however, presents a whole new set of problems.

Some of the so-called value SAL 2/15/00 metals which are currently used as cladding for steel plate have relatively high melting points which are considerably higher than that of steel. A weld made along the cladding will melt the steel beneath the cladding even though the weld does not fully penetrate the cladding. When the steel again solidifies, its physical characteristics are changed, and the result is a region of weakness in the steel backing. This problem has been overcome by interposing a layer of copper between the refractory metal cladding and the steel backing. The copper acts as a heat sin, and although it melts when the refractory metal is welded, it distributes the heat over a widespread area, and this prevents the underlying steel from melting.

The typical pressure vessel possesses a generally cylindrical configuration and often has hemispherical heads. As such, it is fabricated from various components and segments which are welded together. For example, the hemispherical heads each constitute separate components as does the cylindrical side wall which is interposed between them. Often the heads and the side wall are themselves fabricated from a multitude of segments. These components and segments must be welded together in a manner which presents a totally inert surface toward the interior of the vessel.

U.S. Pat. No. 3,443,306 entitled Method of Joining Clad Material discloses one procedure for welding together clad steel components when the cladding is tantalum which is separated from the steel backing by a copper intermediate layer. More specifically, the tantalum cladding and copper intermediate layer are stripped away from the steel backing at each edge where the joint is to be formed and when the two components are brought together, this creates a groove in the otherwise continuous layer of cladding. The groove exposes the steel backing for each component in the region of the joint, and here the two components are welded together along a butt weld in the steel. Next a filler strip of copper is inserted into the groove and either tack welded or continuously welded in place, and then a flat batten strip, which is formed from the same metal as the cladding, is placed over the copper filler strip. The width of the batten strip exceeds the width of the groove so that the edges of the batten strip overlie the cladding on the two components, and along these edges the batten strips are welded to the cladding. Again, care must be exercised to prevent the weld from fully penetrating the cladding, for any total penetration will draw molten copper into the weld and render it brittle.

While the foregoing procedure seems relatively simple, it is not. First, the batten strip is difficult to center over the groove and filler strip because it completely obscures the groove. Should it not be centered, the prospects of melting the filler strip or the weld metal which secures it are increased, and of course whenever such a melt occurs, copper or some other foreign metal is drawn into the tantalum weld to weaken it. Secondly, it is common practice to tack weld the batten strip in place before the fill welds are made along its edges, but the batten strip, being straight in cross section, has a tendency to distort when tack welded. Finally, the copper filler strip and the welds which are used to secure it, represent additional material which increases the cost of the whole procedure.

In addition, the procedures for welding titanium clad steel in U.S. Pat. No. 3,733,686 and tantalum clad copper in U.S. Pat. No. 4,688,691 are also of interest.

SUMMARY OF THE INVENTION

A process is disclosed for metallurgically connecting clad metal sheets or metal tubes of dissimilar metals. In the process of forming such metallurgically bonded joints, a clad metal connecting member is utilized. For metallurgically bonding dissimilar metal tubes, a clad metal tube connecting member is utilized.

In the process of metallurgically bonding clad metal sheets and dissimilar metal tubes, a terminal portion of the connecting member clad metal sheet or connecting member clad metal tube is exposed by removing an underlying area of metal leaving only the clad metal. Thereafter, the terminal portion of the connecting member clad metal sheet is bonded to two similarly exposed terminal portions of two clad metal sheets. Alternatively, a similarly exposed terminal portion of the clad metal layer of the connecting member clad metal tube is metallurgically bonded to a metal tube of the same metal. A metal tube of the same metal as the underlying metal layer of the connecting member clad metal tube is metallurgically bonded to an opposite end of the connecting member clad metal tube with or without the removal of the cladding metal of the clad metal tube connecting member.

The decision as to whether or not to remove one of the clad metals from the bonding area of the clad metal connecting member is based upon the characteristics of the metal to be bonded. For instance, where the clad metal connecting member is formed of titanium clad copper, subsequent to making the bond of the titanium portion of the clad metal connecting member to a titanium tube at one end of the connecting member by welding under an inert atmosphere, the copper tube to be attached at the opposite end of the clad metal connecting member tube need not have the titanium cladding removed since metallurgically bonded copper can be achieved by soldering the copper tube to the copper portion of the clad metal connecting member without interference from the titanium cladding.

BRIEF DESCRIPTION OF THE DRAWINGS

The specific exemplifications of the process for bonding clad metal sheets or dissimilar metal tubes can be more fully understood by reference to the figures in which.

DETAILED DESCRIPTION

Figure 1:
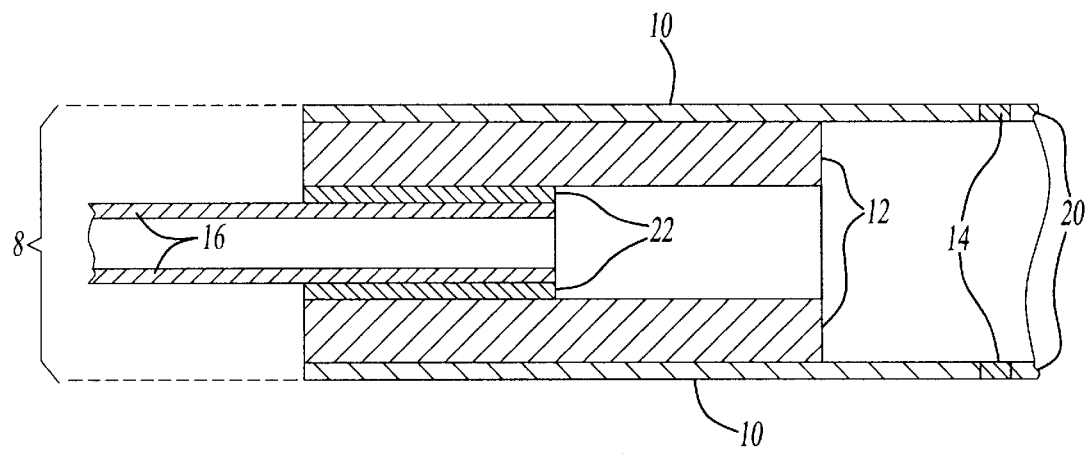
FIG. 1 is a cross-sectional, schematic view of one embodiment of the bonded copper tube to titanium tube by means of the clad metal connecting member of the invention.

In FIG. 1, there is shown in schematic, cross-sectional view, an embodiment of a metallurgically bonded joint between a copper tube 16 and a titanium tube 20. Metallurgical bonds are formed between the titanium tube 20 and the external titanium cladding of the titanium clad copper connecting member 8 comprised of copper layer 12 and titanium layer 10. The copper tube 16 is metallurgically bonded by soldering to the internal copper 12 portion of the clad connecting member at the junction between the copper tube 16 and the copper portion 12 of the clad connecting member at solder joint 22. Since titanium is a poor heat conductor in comparison with copper, it is desirable in order to speed up the soldering of copper tube 16 to copper layer 12 to remove an end portion, opposite to solder joint 22, not shown, of titanium layer 10, prior to soldering.

Figure 2:
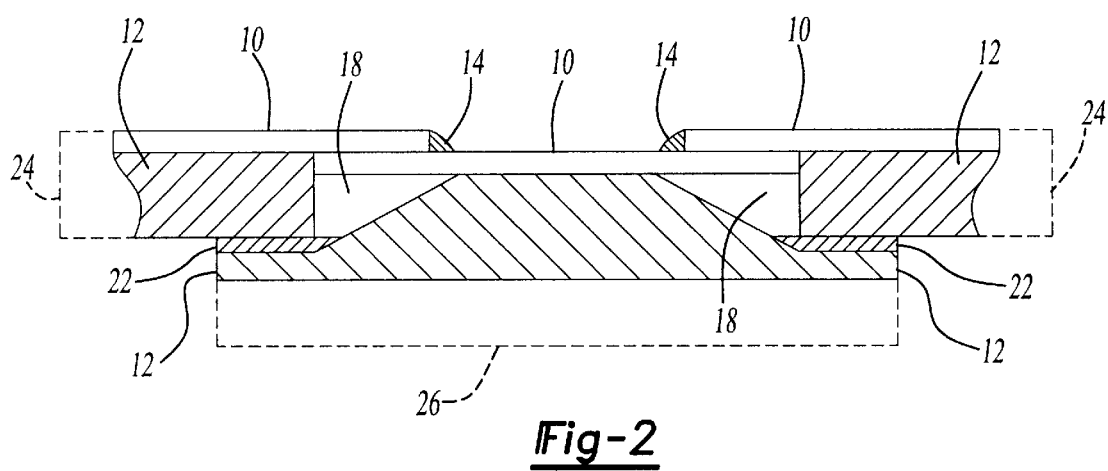
FIG. 2 is a cross-sectional, schematic view through a metallurgically bonded joint between clad metal sheets utilizing a clad metal connecting member of the invention formed from a section of the clad metal sheets to be bonded.

In FIG. 2, there is shown in schematic, cross-sectional view, a metallurgically bonded joint between sheets of a clad metal 24 comprised of titanium layer 10 and copper layer 12. Utilizing a section of the titanium clad copper sheet as a connecting member 26, a portion 18 of the underlying copper layer is removed and connecting member 26 is placed between the titanium clad copper sheets 24. Titanium welds 14 are made between the titanium clad layer of the titanium clad copper connecting member and the titanium portion 10 of the titanium clad sheets 24. The copper portions 12 of the titanium clad copper sheets 24 are soldered to the titanium clad connecting member 26 at the interface between connecting member 26 and the copper portions 12 of the titanium clad copper sheets 24.

Where a titanium clad copper connecting member is utilized to connect titanium tubing to copper tubing, the welding of the titanium cladding of the connecting member to the titanium tubing requires the use of one of the well known inert gas welding methods. Since the weld is made at one end of the titanium clad copper connecting member, it is only necessary to remove a terminal portion of the underlying copper layer from the titanium clad copper connecting member prior to making the weld in order to avoid having the copper function as a heat sink and prevent the titanium from melting. When connecting the titanium clad copper connecting member to copper tubing, the metallurgical bond can be made at the opposite end of the connecting member by soldering at relatively low temperatures. Accordingly, it is unnecessary to remove the titanium cladding from the portion of the titanium clad connecting member prior to soldering the copper tube to the copper portion of the connecting member.

While a titanium clad copper connecting member has been used as an example of a means of connecting copper tubing to titanium tubing, one skilled in the art will understand that other corrosion resistant valve metals can be used as cladding layers instead of t other value SAL 2/15/00 metals SAL 2/15/00 can be used as cladding metals over corrosion susceptible metals. In addition to copper and aluminum, other low-cost metals such as carbon steel can be used as underlying layers in forming the clad metal.

A metallurgically bonded titanium clad, copper tube was machined so as to expose at one end of the tube a layer of titanium. The titanium layer was welded to a titanium tube of the same diameter in the presence of an inert gas. The other end of the titanium clad copper tube connecting member was soldered to a copper tube placed inside the opposite end of the titanium clad connecting member. The copper tubes on one side of the titanium clad connecting member are intended to pass to a compressor and an evaporator of a swimming pool heat pump unit. The titanium tubes are intended to pass to a heat exchanger unit in contact with chlorinated swimming pool water. A unit was assembled in this manner having 40 lineal feet of ¾ inch titanium tubing and 20 lineal feet of ½ inch titanium SAL 2/15/00 tubing. The unit was tested in an evaluation laboratory and found to transfer 102,000 BTU per hour at a water temperature of 80° F., and an air temperature of 80° F., and 80% relative humidity. A similar unit was installed on a 24,000 gallon residential swimming pool and was found to transfer 105,000 BTU per hour with a water temperature of 84° F., an air temperature of 82° F., and a humidity of 82%.

One embodiment of the invention described in this specification, provides a more durable means of connecting the copper tubes of a swimming pool heat pump to a titanium heat exchanger which is in contact with swimming pool chlorinated water. Prior to this invention, titanium heat exchanger tubing has been connected to copper heat pump tubing utilizing a mechanical fitting in which a copper portion is joined to a titanium portion utilizing a threaded connector with an O-ring at a sealing junction. Such a mechanical connection has been required because a means of metallurgically joining a copper tube to a titanium tube was not available. Prior to the use of titanium heat exchanger tubing, copper tubing, cupronickel, 304 and 316 stainless steel, and other alloys were used in swimming pool heat exchangers. Upon exposure to chlorinated swimming pool water, copper slowly turns to a powdery green copper chloride. Heat, chlorine, and acid all make copper corrode faster, and it has been reported that such heat exchangers for use in connection with swimming pools leak within two to five years. Tests involving the use of cupronickel as the tubing for a swimming pool heat exchanger indicate that after an exposure of 48 hours to chlorinated swimming pool water, at the concentration normally used to shack treat swimming pool water net SAL 2/15/00 cupronickel lost 9% of its original weight. Similarly, upon exposure to swimming pool water, 304 and 316 stainless steel heat exchanger tubing corroded even more severely than cupronickel heat exchanger tubing. Pure titanium heat exchanger tubing shows no measurable evidence of corrosion under similar conditions.

While this invention has been described with reference to certain specific embodiments, it should be recognized by those skilled in the art that many variations are possible without departing from the spirit and scope of the invention, and it will be understood that it is intended to cover all changes and modifications of the invention disclosed herein for the purpose of illustration which do not constitute departures from the spirit and scope of the invention.

What is claimed is:

1. A process for metallurgically bonding dissimilar metal tubes with a clad metal tube connecting member, said clad metal connecting member having a cladding layer of a corrosion resistant metal and an underlying layer of a corrosion susceptible metal, wherein said cladding metal and said underlying metal layer of said clad metal connecting member are of the same or similar metals as said dissimilar metal tubes and said cladding metal and said underlying metal layer of said tube connecting member are each metallurgically bondable with one of said tubes to be bonded, said process comprising:

A. Removing from said clad metal tube connecting member a terminal portion of an underlying metal layer and metallurgically bonding the same or similar clad metal to a first metal tube and thereafter B. metallurgically bonding said underlying layer of said clad metal tube connecting member to a second metal tube, C. wherein said metal tubes comprise corrosion resistant metals selected from the group consisting of valve metals, alloys and mixtures thereof, platinum group metals which are metallurgically bonded by welding, and corrosion susceptible metals selected from the group consisting of copper, aluminum, and steel which are metallurgically bonded by soldering or welding.

2. The process of claim 1 wherein said dissimilar metal tubes comprise copper and titanium tubes which are metallurgically bonded, respectively, to said connecting member comprising a titanium clad, copper tube wherein said titanium tube is metallurgically bonded by welding to a titanium clad tube connecting member and said copper tube is metallurgically bonded by soldering to the underlying copper layer of said titanium clad copper tube connecting member.

3. A metallurgically bonded joint between dissimilar metal tubes comprising a corrosion resistant metal tube and a corrosion susceptible metal tube, said joint comprising:

A. a clad metal tube connecting member having a corrosion resistant clad metal layer and a corrosion susceptible underlying layer wherein said tube connecting member comprises the same metals as said metal tubes to be bonded metallurgically, B. wherein said corrosion resistant metal tube is metallurgically bonded to a terminal portion of said clad metal connecting member from which a portion of said corrosion susceptible metal has been removed and, C. wherein said corrosion susceptible metal tube is metallurgically bonded to an opposite end of said clad metal connecting member tube with or without the removal of said corrosion resistant metal.

4. The metallurgically bonded joint of claim 3 wherein said dissimilar metal tubes comprise corrosion resistant metals selected from a group consisting of valve metals, alloys and mixtures thereof and platinum group metals which are metallurgically bonded by welding and corrosion susceptible metals selected from the group consisting of copper, aluminum, and steel which are metallurgically bonded by soldering or welding.

5. The metallurgically bonded joint of claim 4 wherein said dissimilar metal tubes comprise corrosion susceptible, copper and corrosion resistant, titanium tubes which are metallurgically bonded, respectively, to said clad metal connecting member tube comprising a titanium clad, copper tube by welding a titanium tube to a titanium clad connecting member tube and soldering a copper tube to the underlying layer of said titanium clad, copper tube connecting member.

* * * * *